(12) United States Patent
Dellinger et al.

(10) Patent No.: US 11,125,897 B2
(45) Date of Patent: Sep. 21, 2021

(54) COMPACT SEISMIC SOURCE FOR LOW FREQUENCY, HUMMING SEISMIC ACQUISITION

(71) Applicant: BP Corporation North America Inc., Houston, TX (US)

(72) Inventors: Joseph Anthony Dellinger, Houston, TX (US); Mark Francis Lucien Harper, Cambridge (GB); Graham Anthony Openshaw, Portsmouth, NH (US)

(73) Assignee: BP Corporation North America Inc., Houston, TX (US)

( * ) Notice: Subject to any disclaimer, the term of this patent is extended or adjusted under 35 U.S.C. 154(b) by 438 days.

(21) Appl. No.: 15/989,795

(22) Filed: May 25, 2018

(65) Prior Publication Data

US 2018/0275296 A1 Sep. 27, 2018
US 2020/0284931 A9 Sep. 10, 2020

Related U.S. Application Data

(63) Continuation of application No. 14/626,307, filed on Feb. 19, 2015, now Pat. No. 9,983,322.
(Continued)

(51) Int. Cl.
*G01V 1/00* (2006.01)
*G01V 1/135* (2006.01)
(Continued)

(52) U.S. Cl.
CPC .............. *G01V 1/135* (2013.01); *G01V 1/145* (2013.01); *G01V 1/38* (2013.01)

(58) Field of Classification Search
CPC ........... G01V 1/135; G01V 1/145; G01V 1/38
See application file for complete search history.

(56) References Cited

U.S. PATENT DOCUMENTS 3,919,684 A 11/1975 Reed
4,204,278 A 5/1980 Nelson
(Continued)

FOREIGN PATENT DOCUMENTS

CN 103323876 9/2013
WO 2010149589 12/2010

OTHER PUBLICATIONS

PCT International Search Report dated Mar. 7, 2016.
(Continued)

*Primary Examiner* — Hovhannes Baghdasaryan
(74) *Attorney, Agent, or Firm* — Conley Rose, P.C.

(57) ABSTRACT

A compact seismic source for seismic acquisition generating a humming signal includes a casing and a low-frequency reciprocating drive. The casing defines a fluid tight chamber and comprises a first casing section and a second casing section of roughly equal mass. The drive is disposed within the fluid tight chamber and, in operation, reinforces the natural reciprocating oscillation of the first and second casing sections relative to one another at a low seismic frequency. In one aspect, this action omni-directionally radiates the low frequency, humming seismic signal. On another aspect, the compact seismic source is substantially smaller than the wavelength of the low seismic frequency. Such a compact source may be deployed to omni-directionally radiate a low frequency, humming seismic signal during a seismic survey.

20 Claims, 6 Drawing Sheets

Related U.S. Application Data

(60) Provisional application No. 61/942,001, filed on Feb. 19, 2014.

(51) Int. Cl.
*G01V 1/38* (2006.01)
*G01V 1/145* (2006.01)

(56) References Cited

U.S. PATENT DOCUMENTS

| | | | |
|---|---|---|---|
| 4,319,347 A | | 3/1982 | Savit |
| 4,556,963 A | * | 12/1985 | Hugus .................... G01V 1/145 116/137 A |
| 4,758,998 A | | 7/1988 | Johnson et al. |
| 5,233,570 A | | 8/1993 | Donskoy |
| 5,430,689 A | | 7/1995 | Rigsby et al. |
| 6,230,840 B1 | | 5/2001 | Ambs |
| 6,975,560 B2 | | 12/2005 | Berg et al. |
| 7,257,049 B1 | | 8/2007 | Laws et al. |
| 7,725,266 B2 | | 5/2010 | Sirgue et al. |
| 8,699,302 B2 | | 4/2014 | Zowarka et al. |
| 8,958,266 B2 | | 2/2015 | Kragh et al. |
| 9,001,618 B2 | | 4/2015 | Hegna |
| 9,010,484 B2 | | 4/2015 | Coste et al. |
| 9,121,961 B2 | | 9/2015 | Phillips, III et al. |
| 9,158,019 B2 | | 10/2015 | Bagaini |
| 9,217,804 B2 | | 12/2015 | Hatchell et al. |
| 9,304,215 B2 | | 4/2016 | Stork |
| 9,766,355 B2 | | 9/2017 | Brune |
| 9,784,864 B2 | | 10/2017 | Grenie et al. |
| 2007/0195644 A1 | | 8/2007 | Marples |
| 2011/0317515 A1 | | 12/2011 | Tenghamn |
| 2012/0075955 A1 | | 3/2012 | Dean |
| 2012/0147699 A1 | | 6/2012 | Dellinger et al. |
| 2013/0051180 A1 | | 2/2013 | Chelminski |
| 2015/0120200 A1 | | 4/2015 | Brenders et al. |

OTHER PUBLICATIONS

Pot International Search Report dated Mar. 14, 2016.
PCT International Search Report dated Mar. 9, 2016.
PCT International Search Report dated Mar. 2, 2016.
PCT International Search Report dated Apr. 4, 2016.
PCT International Search Report dated Jun. 19, 2015.
Australian Examination Report dated Oct. 14, 2019, for Australian patent application No. 2015218939, filed on Nov. 24, 2015.
Australian Examination Report dated Oct. 14, 2019, for Australian Patent App No. 2015218939 filed on Nov. 24, 2015.
European Patent Application No. 15707503.7 Examination Report dated Feb. 4, 2021 (7 pages).
Canadian Patent Application No. 2,914,068 Examination Report dated Mar. 11, 2021 (4 pages).

* cited by examiner

COMPACT SEISMIC SOURCE FOR LOW FREQUENCY, HUMMING SEISMIC ACQUISITION

CROSS-REFERENCE TO RELATED APPLICATIONS

This is a continuation of U.S. application Ser. No. 14/626,307 filed Feb. 19, 2015, in the name of Joseph Anthony Dellinger et al. and entitled "Compact Seismic Source for Low Frequency, Humming Seismic Acquisition", now pending and allowed, which is hereby incorporated by reference for all purposes.

This application claims priority, under 35 U.S.C. § 119(e), of Provisional Application No. 61/942,001, filed Feb. 19, 2014, incorporated herein by this reference.

DESCRIPTION OF THE INVENTION

Field of the Invention

The present invention pertains to marine seismic sources and, more particularly, to a compact seismic source for low frequency, single frequency, seismic acquisition.

BACKGROUND OF THE INVENTION

A relatively recent development in seismic acquisition is low-frequency acquisition at a single frequency. This is sometimes referred to as a "humming acquisition". More precisely, "humming" is using a non-impulsive controlled-frequency source that generates substantially all of its energy at a single frequency. Due to practical stability limitations the source may instead perform a controlled or uncontrolled drift within a narrow frequency range, typically staying within plus or minus one tenth of an octave around the nominal frequency. This is sometimes what is called "monochromatic" or "near monochromatic", for example in U.S. application Ser. No. 13/327,524.

Humming acquisition may occur in several different ways. For example, stepped humming is a sequential humming acquisition in which a single source steps over a set of two or more discrete frequencies, one at a time. The time spent moving between frequencies should be very small compared to the time spent at each frequency. Chord humming is a humming acquisition in which one or more sources simultaneously hum at differing, discrete frequencies. More information is available in U.S. application Ser. No. 13/327,524.

Seismic sources such as those presented in the aforementioned application are suitable for their intended purpose. However, the art is always receptive to improvements or alternative means, methods and configurations. The art will therefore well receive the seismic source described herein.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Figures 1, 2:
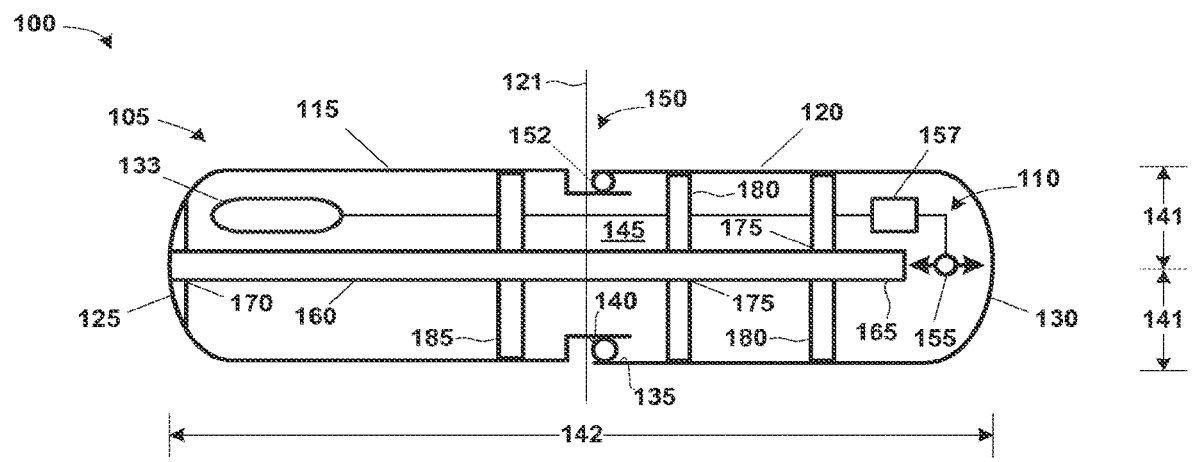
FIG. 1 depicts one particular embodiment of a low frequency, single frequency seismic source.
FIG. 2 illustrates seismic acquisition using the seismic source of FIG. 1 in one particular embodiment.

Turning now to FIG. 1, one particular embodiment of a low frequency, humming, compact seismic source 100 is shown. A compact source is a term used by those versed in the art of acoustics and in the present context to denote a source whose dimensions are much less than the smallest wavelength of its emitted signal and which consequently radiates omni-directionally in a homogeneous isotropic fluid such as the water in which a marine seismic survey is conducted.

The term "humming" does not mean in this context that the seismic source is capable of producing seismic signals of only a single frequency, although that may be the case in some embodiments. It instead refers to a mode of operation in which the seismic source emits signals of only a single frequency for a limited duration at some point in its operation. That is, at some point in its operation, a non-impulsive controlled-frequency seismic source generates substantially all of its energy at a single frequency for a limited duration. In one embodiment, "substantially all of its energy" means 95% of its energy within ±0.1 octave. The duration will typically be sufficiently long that its inverse exceeds the frequency resolution required for the task in hand and will be much longer than one cycle of the emitted signal.

For example, the discussion of humming acquisition set forth above contemplates an acquisition in which the source steps over a set of two or more discrete frequencies, one at a time. Such a source is considered a humming source within the context of this disclosure because it emits signals of only a single frequency for intervals of time much longer than the period of the seismic signal during its operation. This is true even though it does so more than once employing more than one frequency at different times.

Note also that "low frequency" is "low" as considered within the seismic surveying art. In this context, "low frequency" is less than about 6-8 Hz and, more typically, less than about 4 Hz. The term "about" is a recognition that in acquisition seismic sources may come out of calibration or be poorly calibrated, simultaneously radiate at additional frequencies (for example from harmonics or from noise from a compressor), or that their signals can drift or in other ways deviate from what is desired. Thus, the term "about" means that the actual frequency is within the operational error acceptable to those in the art relative to the desired frequency of acquisition.

Returning to FIG. 1, the seismic source 100 is, more particularly, a compact seismic source. The seismic source 100, in operation, generates a signal of primarily a single frequency at any time. That is, the seismic source 100 is a "humming" source as humming is described above. The seismic source 100 comprises a casing 105 and a low-frequency reciprocating drive 110 disposed within the casing 105 in a manner described more fully below.

The casing 105 is comprised of two casing sections 115, 120. They are constructed of conventional materials well known to those in the art. The first and second casing sections 115, 120, when assembled, are of roughly equal mass. What constitutes "roughly equal" may vary from embodiment to embodiment because equal masses give the lowest possible resonant frequency for a given overall size and mass of the seismic source 100 as a whole. Thus, embodiments in which the seismic source 100 emits lower frequencies will seek to have more equal masses while embodiments emitting less low frequencies may tolerate greater inequality in the masses. In the illustrated embodiments, the two masses are within ±10% of one another.

Each of the sections 115, 120 includes a respective domed end 125, 130 on the end most distal from the mid-point of the seismic source 100. In the illustrated embodiments the domed ends 125, 130 are "hemispherical". The ends 125, 130 are domed (i.e., have smooth convex profiles) to reduce hydrodynamic drag during reciprocation. In general, if the dome is considered as being half an ellipsoid of rotation with the major axis as the axis of rotation, and with that axis along the axis of the source, the larger the ratio of major to minor axis (i.e., the more pointed the ellipsoid), the less the drag.

However, other considerations mitigate for the hemispherical design of the domes. For example, the hemispherical shape is easy to manufacture and gives most of the drag reduction without causing problems of side-loading if the device is at an angle to the tow direction. Additional information regarding the shape of the domed ends 125, 130 may be found in U.S. application Ser. No. 12/980,527. Note that alternative embodiments may employ different domed shapes for the ends 125, 130.

The casing 105 defines a fluid tight chamber 145. The first and second sections 115, 120 are joined by a sliding fluid-tight seal 150 allowing relative motion between the two sections 115, 120. The sliding fluid-tight seal 150 of the embodiment in FIG. 1 is defined by the sealing element 152 sliding across the smooth sealing faces 135, 140 of the two sections 115, 120. Note that the outer diameter of the first section 115 is stepped down at the seal 150 to maintain a smooth outer profile for the seismic source 100. While this has a salutary effect on the operation of the seismic source 100, it is not necessary to the practice of the invention.

The sliding fluid-tight seal 150 may comprise any suitable sealing technique known to the art, providing it permits the sliding engagement of the sections 115, 120. In the illustrated embodiment, the sealing element 152 is a spring-energized polyethylene lip seal such as is known in the art. In other embodiments, the sealing element is an elastomeric lubricated O-ring. The sealing faces 135, 140 are typically surfaced with some kind of chrome alloy or other similar material to provide a smooth hard sealing surface.

The low-frequency reciprocating drive 110 is disposed within the chamber 145. The disposition should maintain the mass distribution of the sections 115, 120 so that the mass of the two sides across the midline of the seismic source 100 are roughly equal. In the illustrated embodiment, an excitation actuator 155 is disposed in the second casing section 120. The excitation actuator 155 is mechanically linked to a centered push-pull rod 160 at one end 165 thereof. The push-pull rod is affixed to the first casing section 115 at a second end 170 thereof.

In the illustrated embodiment the push-pull rod 160 is supported by two bearings 175 mounted upon stanchions 180 in the second half 120 and a stanchion 185 in the first half 115. Note that the push-pull rod 160 does not move relative to the first half 115 and so no bearing is needed for the stanchion 185. These types of supports may be omitted in some embodiments.

The seismic source 100 has a source 133 of compressed gas operationally coupled to the chamber 145. In some embodiments, this gas source may be a gas reservoir of compressed gas housed within the chamber 145 as shown in FIG. 1. In other embodiments, the compressed gas reservoir may be housed outside of the seismic source 100, say onboard the tow vessel (not shown), and the compressed gas delivered to the seismic source 100 by way of an umbilical (not shown), for example. With respect to the umbilical, if it attaches to either of the sections 115, 120 it should not impede their reciprocating motion. It will not normally do so if the tow line is close to the vertical at the point of attachment or if the tow line is elastic.

The compressed gas is used to adjust the internal gas pressure of the seismic source 100 to compensate for gas leaks, temperature changes, and other water conditions. These kinds of adjustments may be desirable to keep the device on its desired resonant frequency while maintaining a desired tow-depth window. In some embodiments, the casing 105 may house a valve mechanism (not shown) to release gas to the external environment, in order to lower the internal gas pressure of the seismic source 100. Alternatively, in some embodiments, the internal pressure in chamber 145 may be lowered by means of a pump (not shown) that can force gas back into the gas reservoir 133.

The gas may be chosen to be oxygen-free to avoid accidental combustion when under pressure. Nitrogen is preferable to air in this respect, as is known to those versed in the art. Other inert gasses with a lower adiabatic ratio than nitrogen may also be used to lower the resonant frequency. For example, a gas like sulfur hexafluoride may be used and because of its low adiabatic index it could allow lower frequencies to be achieved.

More particularly, internal gas spaces of the seismic source 100 are normally pressurised to match the external hydrostatic pressure. This is done by filling these internal spaces with an inert gas. The inert nature of the gas avoids the danger of fire which would increase with pressure if these spaces were filled with air. Nitrogen is a suitable alternative to air.

The compact seismic source 100 radiates a very low-frequency seismic signal, and its resonant frequency depends inversely on the adiabatic compressibility of the gas within it. That means that the less stiff the gas appears in response to rapid changes of volume, the lower the resonant frequency will be. To this end, it may be advantageous to fill the seismic source 100 with a gas selected for having high adiabatic compressibility.

This will be directly proportional to the so-called adiabatic index of the gas, which is to say the ratio of its principal specific heat at constant pressure to that at constant volume. This ratio is smaller for gases whose molecules have more degrees of freedom of vibration, being equal to about 1.67 for a monatomic gas, 1.4 for a diatomic gas such as nitrogen, and decreasing asymptotically towards unity for more complicated molecules with many degrees of freedom.

For example sulphur hexafluoride is an inert gas with an adiabatic index of about 1.09, or 28% lower than nitrogen.

A source 100 filled with sulphur hexafluoride will thus have a resonant frequency significantly lower than the same source 100 filled with nitrogen. Those of skill in the art having the benefit of this disclosure will appreciate that mixes of two or more gasses could also be used, and adjusting the proportions of the gas mixture (for example, by releasing different gasses from two or more gas reservoirs) provides another way to adjust the device's resonant frequency at a given tow depth. Care should be taken in the design of such a device because the speed of sound in a gas is equally dependent on its adiabatic ratio. The internal spaces must be designed to avoid standing acoustic waves within the seismic source 100 since these may interfere with its operation. More specifically if the internal space 145 is close to being an integral number of half-wavelengths long at the intended operating frequency of the source, then the internal gas will present a significant (high value) impedance at this frequency and the natural frequency of the system will shift towards higher frequencies. However, if the internal space 145 is close to being an odd number of quarter-wavelengths long at the intended operating frequency of the source then the internal gas will present a very low value impedance at this frequency and the natural frequency of the system will shift towards lower frequencies.

Some embodiments may also implement short-term, minor adjustments of the frequency by adjusting the phase of the feedback of the excitation actuator 155. This control may be exerted by an electronic controller 157 housed in the chamber 145. In this particular embodiment, the electronic controller 157 includes a power source and associated electronics not otherwise shown. The electronic controller 157 may alternatively be housed outside the seismic source 100, perhaps on the tow vessel, and transmitted to the seismic source 100 via, for example, an umbilical.

The depiction of the electronic controller 157 and the compressed gas source 133 in FIG. 1 is conceptual only. The placement, construction, and mounting of the electronic controller 157 and the compressed gas source 133 are subject to the design considerations mentioned. Examples of these considerations include, for example, weight distribution and water tightness for the seismic source 100 as a whole. Those in the art having the benefit of this disclosure will appreciate these considerations and how to deal with them in a given implementation.

Some embodiments may also include one or more interior compartments (not shown in FIG. 1; an example is shown in 620), or auxiliary external gas spaces (not shown), that could be sealed off from the space 145 or opened to it by servo or hydraulically controlled valves (not shown in FIG. 1; an example is shown in 605), allowing the resonant frequency to be controlled by changing the compressibility of the gas volume defined thereby. This mechanism would provide a way to quickly jump back and forth between two or more frequencies while keeping the seismic source 100 at an approximate constant depth. Smaller changes in volume could be used to re-center the central resonant frequency as needed, allowing the compressed-gas reservoir to be tapped less frequently. The compartments/gas spaces could be organized into a "powers of 2" hierarchy so that a wide range of resonant frequencies could be specified by opening and closing various combinations of compartments.

As is apparent from the discussion above, the frequency of the marine seismic source will depend on, among other factors, the volume of gas that it contains. The frequency will depend inversely on the square root of this volume. This dependence comes about because of the variation in pressure of the gas as the two sections 115, 120 of the casing 105 move relative to one another. The source frequency will depend on the rate at which this pressure changes with casing position. It is therefore possible to change the frequency by changing the volume of gas whose volume changes with casing displacement.

Figure 6A:
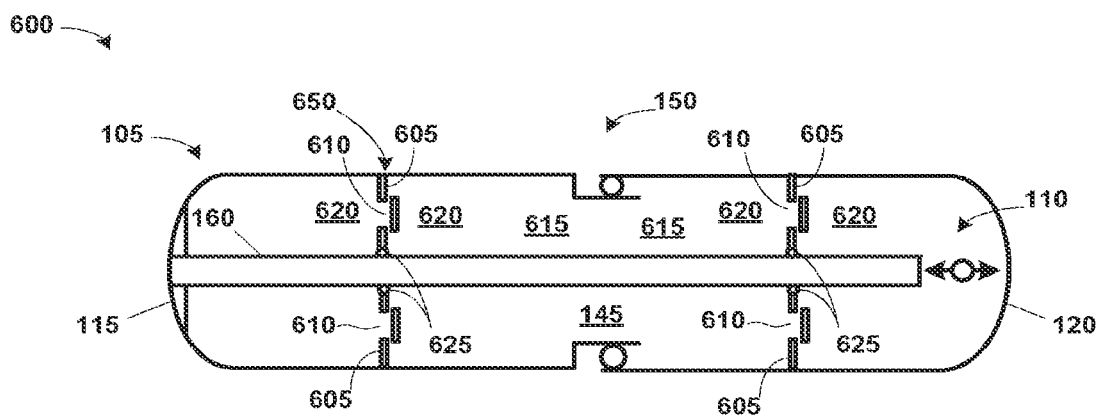
FIG. 6A-FIG. 6C illustrate one particular embodiment including a valving system to allow stepwise control of the internal compressible gas volume of the seismic source in FIG. 1.
Figure 6B:
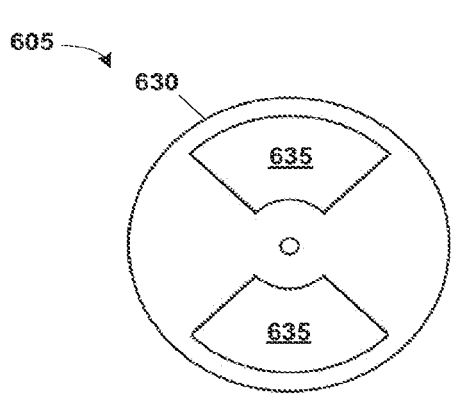
Figure 6C:
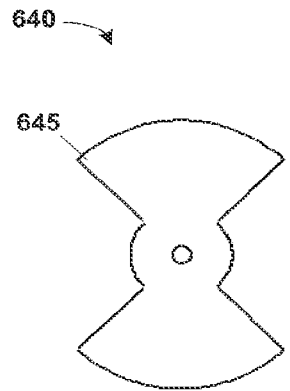

Consider the embodiment of 600 in FIG. 6A-FIG. 6C. The change in gas volume may be effected by introducing gas-tight bulkheads 605 into each half 115, 120 of the casing 105 with large ports 610. The ports 610 may be opened or closed to either allow free flow of gas across the bulkhead 605 if open or to prevent flow if closed. Any such bulkhead 605 should be stiff enough to prevent it from bowing significantly in response to the difference in gas pressures on its two faces that will occur when the casing sections 115, 120 move. The areas and shapes of the ports 610 must be such as to present negligible flow resistance to the gas when they are open.

A suitable arrangement of bulkheads 605 is conceptually illustrated in FIG. 6A. Each of the casing sections 115, 120 has its internal volume 615 divided in two parts 620 by a bulkhead 605. Each bulkhead 605 is penetrated by the push-pull rod 160 which passes through a seal 625 allowing it to move axially with little or no resistance in a manner well known to those versed in the art.

When the ports 610 are open, the resonant frequency of the source 600 is negligibly affected by the presence of the bulkheads 605. When the ports 610 of one bulkhead 605 are closed and those of the other are open, the internal gas volume whose volume varies with the motion of the casing 105 is effectively reduced by a quarter, which increases the resonant frequency by a factor of $$\sqrt{\frac{4}{3}}$$

relative to the frequency when all ports 610 are open. If the ports 610 in both bulkheads 605 are closed, the resonant frequency is increased by a factor of $\sqrt{2}$ compared to its value when all ports 610 are open.

The bulkheads 605 and the ports 610 may for example be shaped as follows: A bulkhead 605 consists of a flat disc 630 with two port apertures 635 as shown in FIG. 6B. A rotor 640, shown in FIG. 6C, is mounted co-axially with and in contact with the bulkhead 605. The rotor 640 rotates so that its wings 645 cover the port apertures 635 at two angular positions and leave them clear at two others. In the closed position, the rotor 640 seals the port apertures 635 against fluid flow therethrough. In combination, the bulkhead 605 and rotor 640 form a valve 650 that, when in the open positions, allows flow through an area approaching half the area of the disc 630.

In the illustrated embodiment, the port apertures 635 are shaped like what might be called "truncated wedges". Alternative embodiments might choose other shapes for the port apertures 635. For example, some embodiments might shape the port apertures as circles or ovals and still other shapes might be used. The design of the rotor 640 might also be changed to accommodate the change in the shape of the port apertures 635 in these embodiments.

In an alternative embodiment (not shown), casing 145 contains interior compartments that do not extend across the push-pull rod 160, eliminating the need for seals 625. In this embodiment one or more bulkheads 605 control whether or not the gas inside an interior compartment is in fluid communication with internal space 145. An interior compartment disposed in this way is particularly suitable for making smaller adjustments to the compressible gas volume (i.e. a few percent, instead of the 25 percent for the axially disposed bulkheads shown in FIG. 6A). Larger adjustments may be achieved if there are multiple internal spaces, each controlled by bulkhead(s), and these are used additively.

Referring back to FIG. 1, in the illustrated embodiment, an umbilical (not shown) is fitted to the seismic source 100. Compressed gas and various control signals are sent to the seismic source 100 and its components via this umbilical. Similarly, outputs from a number of sensors used to detect relative position and other parameters, for example, are transmitted back up to the surface through the umbilical.

In an embodiment, the two sections 115, 120 of the seismic source 100 will naturally vibrate at a resonant frequency defined chiefly by their masses plus the added mass of entrained fluid and the reciprocal of the compressibility of the gas space 145. The excitation actuator 155, in operation, pushes and pulls the first section 115 relative to the second section 120 in a manner that reinforces that natural reciprocating oscillation. That is, the excitation actuator 155 operates and is controlled to operate to ensure that two sections 115, 120 oscillate at the natural, resonant frequency of the seismic source 100. This causes the seismic source 100 radiate a low frequency, single-frequency seismic signal at the natural resonant frequency of the two sections 115, 120.

The resonant frequency of the two sections 115, 120 is a function of the depth at which the seismic source 100 is towed because the compressibility of the gas in the space 145 depends inversely on its pressure which will be equal to the hydrostatic pressure of the surrounding fluid. The resonant frequency of the seismic source 100 therefore can be controlled by adjusting the tow depth. Changing the depth will change the hydrostatic pressure to which the seismic source 100 is subjected. This will, in turn, affect the relative positions of the two sections 115, 120.

More particularly, if left uncontrolled, the relative positions of the sections 115, 120 will change in response to depth changes in such a way that the internal pressure of the seismic source 100 stays equal to the external, hydrostatic pressure. Note that if depth changes sufficiently, the responsive position change could continue in some circumstances until the seal 150 reaches the end of its travel. Hard stops (not shown) will therefore normally be provided to prevent the two sections 115, 120 from coming apart or colliding. Accordingly, the mass of gas within the chamber 145 may be controlled to maintain the relative positions of the two sections 115, 120 so that the sealing element 152 is maintained near the center of the sliding surface 140. This is one use for the compressed gas source described above.

The seismic source disclosed herein is dedicated to a low frequency, single frequency type of acquisition. It does not provide signals of the kind known in the art as "broadband swept-frequency" signals. Accordingly, the design can be considerably simplified and the device lightened by omitting elements of broadband sweeping sources and its size compacted. Of particular note is eliminating the variable-stiffness gas spring and associated squeeze piston(s) used in broadband sweeping acquisition as shown in U.S. application Ser. No. 12/995,763.

One advantage of the size of the compact seismic source 100 is that it radiates the seismic signals it emits "omni-directionally" as is the signal 200 shown in FIG. 2. More particularly, the seismic source 100 radiates an acoustic seismic signal 200 omni-directionally because it is much smaller than the wavelengths of the frequencies that it radiates. Note, however, that the wavelengths of the signal being radiated (380 m or greater) are so large that the seismic source 100 could be several times its likely size and still be a compact, omni-directional, acoustic source. In this particular embodiment, the low-frequency seismic signal 200 is in the range of 0.5-2 Hz. As discussed herein, the signal emitted is omni-directional because it radiates a signal in all directions (in three dimensional space) at substantially the same frequency and magnitude.

Figure 3A:
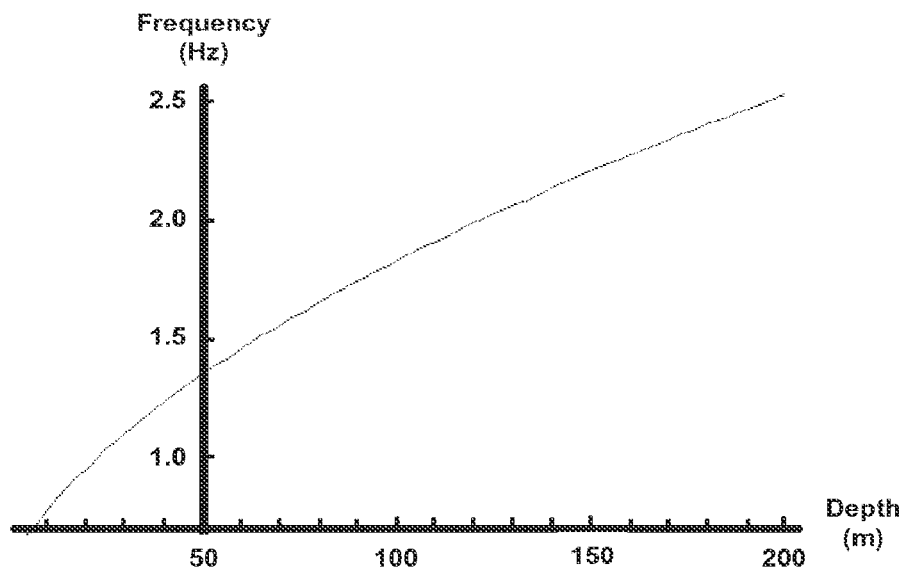
FIG. 3A-FIG. 3B graph selected aspects of the performance of the seismic source in FIG. 1.
Figure 3B:
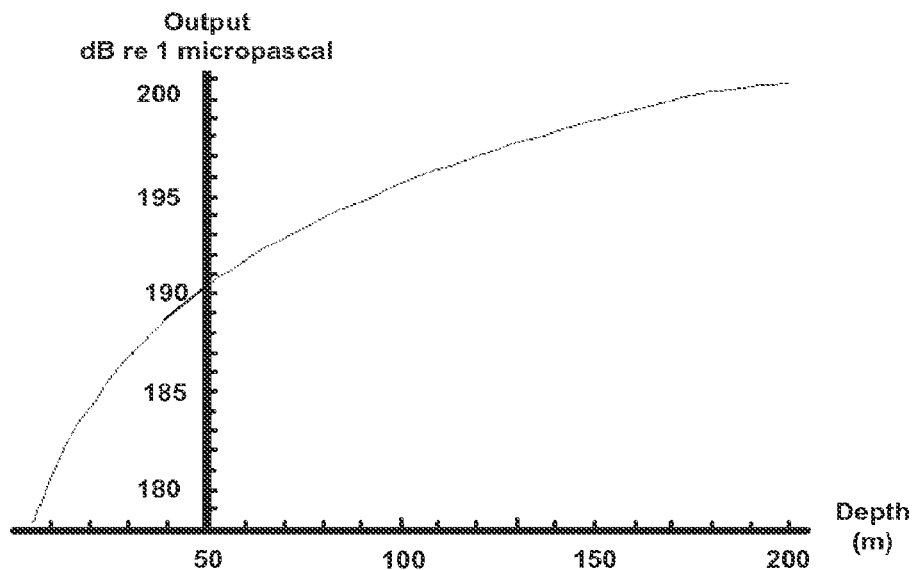

The operation of the embodiment in FIG. 1 is constrained by the sliding length of the sealing face 140, push-pull rod 160 travel, maximum velocity that the sealing element 152 can tolerate, and device volume. The low end of the achievable frequency range will depend on the volume of the space 145 and the masses of the casing halves 115, 120. Assume a volume of order 10 cubic meters and a total mass of order 30 tons. The frequency would vary with depth roughly as shown in FIG. 3A. The acoustic output would also vary strongly as shown in FIG. 3B, partly because the source, like any compact acoustic source, is a less efficient radiator at lower frequencies and partly because of the surface ghost. A surface ghost is caused by the surface of the water, which acts as an acoustic mirror, causing "ghost" effects in recorded seismic data.

At frequencies below about 2.4 Hz (i.e., depths down to about 180 m) the output is limited by push-pull rod 160 stroke and, above this, by seal velocity—i.e., the relative velocity with which the seal attached to the casing moves over the sealing surface of the piston. The scale in FIG. 3A-FIG. 3B is referenced to dB re 1 µPa at 1 m, not re 1 µPa/Hz, because the seismic source is emitting a continuous signal. To get the output in dB/Hz simply add 20 $\text{Log}_{10}(T)$ to the scale, where T is the hum duration in seconds.

The conventional acquisition-geophysicist's measure of dB/Hz, which integrates the total energy in a "shot", starts to be less meaningful in this single-frequency context in which the signal may emanate for minutes or even hours instead of the 10-16 seconds of a standard airgun repeat interval. Since the seismic source 100 will be competing with continuous random background noise whose spectrum is measured in power per unit bandwidth, dB re 1 µPa/√Hz, it will be more useful to measure the acoustic power divided by its bandwidth. The seismic source 100 should therefore maintain a stable frequency to minimize its bandwidth and thus maximize its power per unit bandwidth.

The illustrated embodiments achieve frequency stability of 2% or better, which determines the bandwidth. So, for example, the bandwidth is about 0.02 Hz for a 1 Hz signal, and so on. This assumes that the signals will last longer than the inverse of the bandwidth (i.e., longer than about 50 seconds). Thus, to get the output in dB re 1 µPa/√Hz, add 10 $\text{Log}_{10}(1/B)$ to the dB figure re 1 µPa, where B is the bandwidth.

For example, suppose the embodiment of the seismic source 100 discussed above is operated at 23 m depth. This will allow it to emit a single-frequency signal at 1 Hz. From FIG. 3A, the source would produce 185 dB re 1 µPa at 1 m. Add 17 dB to correct for bandwidth and the measure is 202 dB re 1 µPa/√Hz. Thus, at 1 m one would have a signal-to-noise ratio of 102 dB if the background noise level were 100 dB re 1 µPa/√Hz. This will decline to 13 dB at a distance of 30 km, based on an assumption of simple spherical spreading. Accordingly, with a stable frequency, the seismic source 100 can generate an adequate signal for seismic acquisition compared to background noise.

Figure 4A:
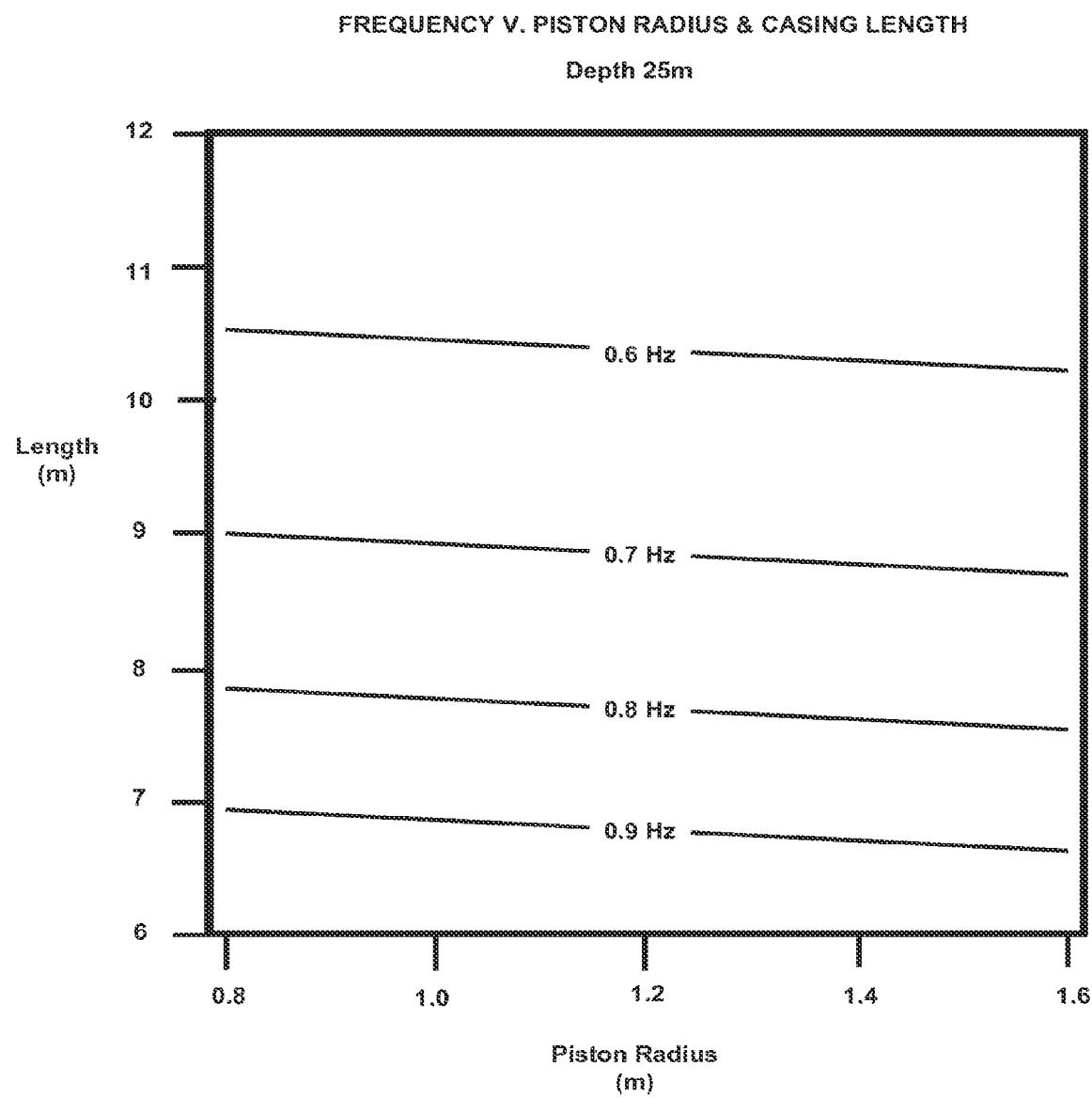
FIG. 4A-FIG. 4C graphically illustrate selected aspects of design tradeoffs for the seismic source in FIG. 1.

However, other design parameters may also be used to define the output of the seismic source 100. The factors determining its lowest frequency are the masses of the casing halves 115, 120, the area of cross section of the casing half 115 at the sealing face 140, and the casing gas volume 145 (it decreases with increase in either). The constraints on its output amplitude are push-pull rod 160 stroke; sealing element 152 velocity; and the sliding length of the sealing face 140. For this discussion, the seismic source 100 will be designed to achieve 0.7 Hz frequency at 25 m. The contour plot in FIG. 4A shows how the resonant frequency will behave as a function of the casing radius 141 and casing length 142. The scales run from a radius equal to 0.8-1.6 m and a length equal to 6-12 m. The individual contour lines give the locus of possible radius/length combinations for a particular frequency. Thus, the embodiment of FIG. 1 can achieve 0.7 Hz with a length of approximately 9 m.

Note from FIG. 4A how little effect the casing radius 141 has on the resonant frequency. This is for two reasons. Firstly, the moving mass consists almost entirely of mechanical mass, with only a small contribution from fluid added mass. Secondly, the mechanical mass has been set to be proportional to casing volume, so that increased casing radius 141 (which increases the spring stiffness of the gas cavity) is compensated by increased mass.

Figure 4B:
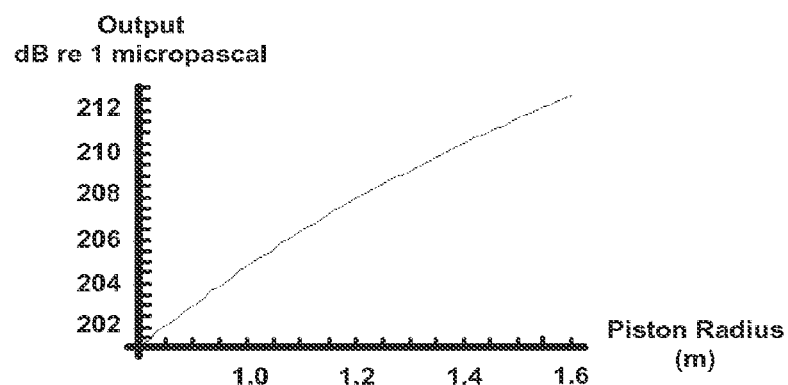
Figure 4C:
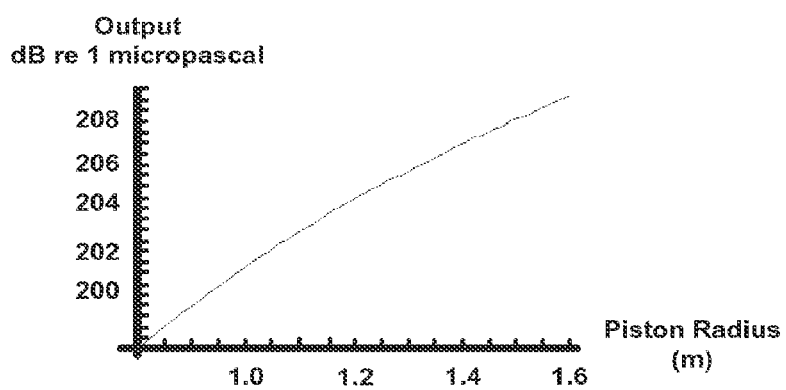

Turning now to output level, setting the length at 9 m and increasing the stroke in proportion to that length (La from ±0.2 m to ±0.3 m) to get the frequency right, FIG. 4B graphs far-field output (i.e., accounting for the effect of the free-surface ghost) in dB re 1 µPa/√Hz@1 m (i.e., in units allowing comparison with background noise). FIG. 4B illustrates that this design at 0.7 Hz can very nearly match the output of the previous example discussed above (i.e., relative to FIG. 3A-FIG. 3B) operating at 1 Hz. This can be done without increasing the casing radius 141, and instead increasing the push-pull rod 160 stroke. Alternatively, one could retain the original stroke and increase the casing radius 141, as shown in FIG. 4C.

Figure 5A:
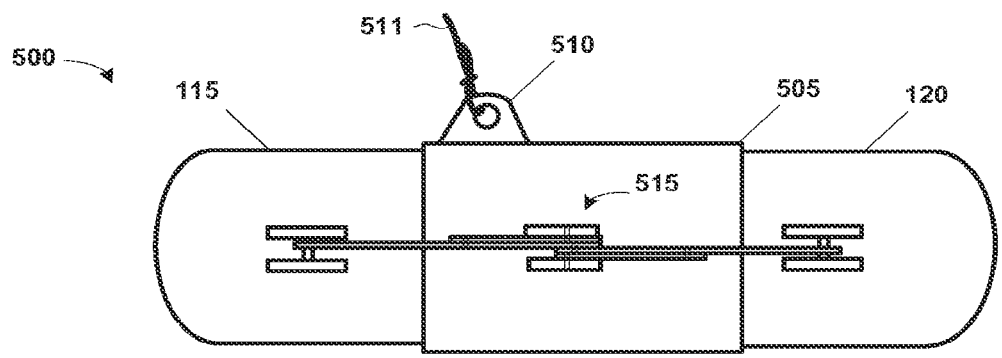
FIG. 5A-FIG. 5C depict one particular embodiment of a low frequency, single frequency seismic source.
Figure 5B:
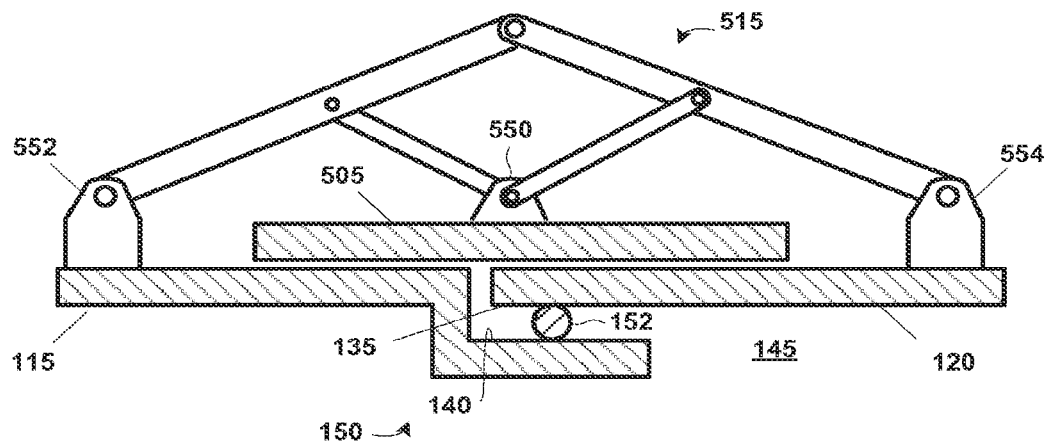

Some implementations of the embodiment of FIG. 1 might impart excessive accelerations on electronics and/or fail to provide a stable location for a tow point and/or umbilical attachment. An alternative design would have a central stable section with a moving nose on each end. One such design is presented in the embodiments of FIG. 5A-FIG. 5B. FIG. 5B is a side view of the mechanical linkage 515, while FIG. 5A shows a top view of the mechanical linkage 515.

This seismic source 500 differs from the embodiment of FIG. 1 in that it includes a stationary section 505 with a tow point 510 to which a tow line 511 may be attached. Note that the first and second sections 115, 120 still reciprocate relative to one another at the sliding fluid tight seal 150. The functional relationship between the stationary section 505 and the first and second sections 115, 120 is governed by the mechanical linkage 515 consisting of hinged struts of lengths carefully chosen to allow section 505 to remain stationary while sections 115, 120 reciprocate. In particular, the axes of rotational motion of the hinges 550, 552, 554 must be coplanar and must lie in a plane parallel to the direction of relative motion of the sections 115, 120 and osculating the cylindrical surface of the stationary section 505. Note that the mechanical linkage 515 illustrated is but one means by which the stationary section 505 may be functionally tied to the first and second sections 115, 120 and other means may be used in alternative embodiments.

Figure 5C:
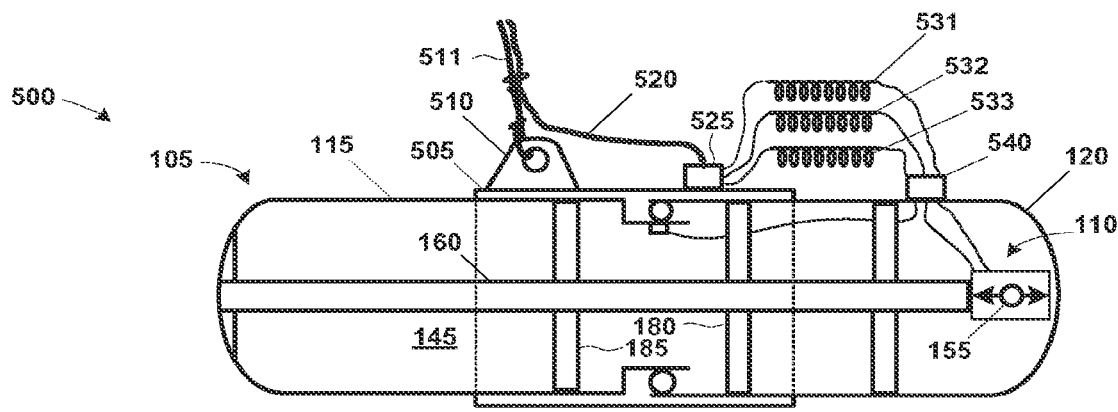

In one embodiment shown in FIG. 5C, the source 500 includes an umbilical 520 that attaches to the stationary section 505 through a junction box 525. The umbilical 520 runs from the surface, typically a survey vessel such as the vessel 210 in FIG. 2, and includes leads for the compressed gas, control, and power as described above. These are continued from the junction box 525 to a penetration 540 mounted on one of the moving sections 115, 120 via highly flexible leads 531-533. These leads 531-533 should not impede the reciprocating motion of the two sections 115, 120 and should be resistant to fatigue caused by the relative motion of the sections 115, 120, 505. They may for example be coiled. They enter the section 115 or 120 via the penetration 540 and connect to equipment therein. Other considerations, such as water tightness and weight distribution, applicable to embodiments described above, also apply. Note that the umbilical 520 permits the removal of some components found in some embodiments from the depicted source 500 to, for example, the survey vessel.

Returning to FIG. 5A-FIG. 5C, not shown therein is ancillary equipment such as hydraulic power supplies and accumulators, electric transformers, etc. This ancillary equipment may conveniently be mounted on a skid or other mounting means attached to the central section and situated underneath it. The device would rest on this when on deck or on land.

Figure 7:
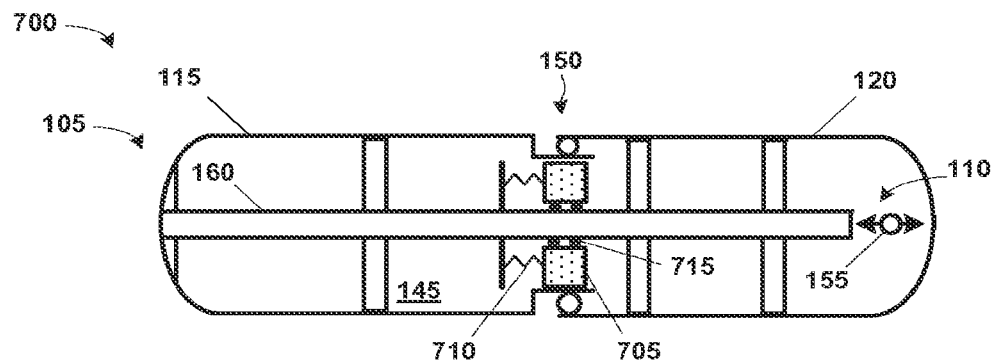
FIG. 7 depicts another particular embodiment of a low frequency, single frequency seismic source alternative to that shown in FIG. 1 and in FIG. 5A-FIG. 5B and FIG. 5C.

Some embodiments, such as the seismic source 700 in FIG. 7, may be designed to have more than one degree of freedom of vibration within the frequency range. One may, for example, attach masses 705 (only one indicated) on springs 710 (only one indicated) to one or both sections 115, 120 of the casing 105. The masses could be positioned in annuli that slide along the push-pull rod 160 on linear bearings 715 (only one indicated). Each mass/spring combination will use its own excitation actuator (not shown). Note that these components should be disposed in the chamber 145 evenly enough to maintain the roughly equal masses of the first and second sections 115, 120.

The masses 705 should be near the center of the device 700 to avoid changing the trim of the device 700. The masses 705 will affect the dynamics of the fundamental resonance, for which other aspects of the design as discussed above should compensate. The masses 705 may also increase negative buoyancy, and so their size should be minimized. If the suspension (i.e., spring 710 plus bearing 715) is sufficiently low-loss, the masses 705 can be smaller with an increased travel to get the same forces. For example, we could use a mass 705 with a fifth the mass of the casing 105, travelling five times as far, to get the same force on the casing 105. Steel springs are low-loss and linear, and, hence, are well suited.

This mass/spring mechanism cannot be adjusted once the seismic source 700 is deployed. Thus, if the frequency changes (e.g., if the depth or the mass is changed), they will not track the change and modify their operation accordingly. This could be addressed by using gas springs (not shown), with their equilibrium pressure maintained equal to the pressure in the main gas space so that they do track. However, they will have higher losses than steel springs (seal friction), and they will not be linear. This may make it harder to reduce the oscillating mass by using large travels. It will increase the power of the extra actuators needed to drive the masses. Their frequency may drift as friction heats up the gas in the springs unless the pressure control is very good. It will also mean that to some extent, unwanted higher harmonics will be generated.

The velocities of the linear bearings 715 will be high. A brass plain bearing may manage a velocity of 6 m/s. For higher speeds, magnetic or hydrodynamic bearings might be needed.

The "transfer impedance" between the two ends of the seismic source 700 (if one end creates a pressure in the water, it acts on the other) may modify the output of the harmonics. It is anticipated that this effect will not be significant.

The following patent applications and patents are hereby incorporated by reference for those portions that are listed and for the purposes set forth as if set forth verbatim herein.

U.S. application Ser. No. 13/327,524, entitled, "Seismic Acquisition Using Narrowband Seismic Sources", filed Dec. 15, 2011, in the name of the inventors Joseph A. Dellinger et al., published Jun. 21, 2012, as U.S. Patent Publication 2012/0155217, and commonly assigned herewith for its teachings regarding data acquisition located at ¶¶[0024]-[0040], [0054]-[0059], [0065]-[0088].

U.S. Pat. No. 8,387,744, entitled, "Marine Seismic Source", and issued Mar. 5, 2013, to BP Corporation of North America as assigned of the inventors Mark Harper et al. and commonly assigned herewith, for its teachings regarding the design of the domed ends of the source disclosed therein found in column 6, line 64 to column 8, line 11.

To the extent that any patent, patent application or paper incorporated by reference herein conflicts with the present disclosure, the present disclosure controls.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A compact marine seismic source for seismic acquisition generating a humming signal, the source comprising:
    a casing defining a gas filled fluid tight chamber and comprised of a first casing section having a first mass and a second casing section having a second mass, wherein the first mass and the second mass are each selected to generate a predetermined resonant frequency for the source;
    a bulkhead positioned within the fluid tight chamber, wherein the bulkhead includes a port that is configured to be selectively opened to allow fluid communication through the bulkhead;
    a controller;
    a low-frequency reciprocating drive disposed within the fluid tight chamber that, in operation, reinforces the natural reciprocating oscillation of the first and second casing sections relative to one another at a low frequency to omni-directionally radiate a low frequency, humming seismic signal; and
    wherein a frequency of the source is controlled by adjusting a tow depth of the source using the controller.

2. The compact seismic source of claim 1, wherein the first and second sections are joined by a sliding fluid tight seal allowing relative motion.

3. The compact seismic source of claim 1, wherein the first and second casing sections each include a hemispherically-domed end.

4. The compact seismic source of claim 1, wherein the reciprocating drive comprises:
    an excitation actuator disposed in the second casing section; and
    a push-pull rod mechanically linked to the excitation actuator at one end thereof and affixed to the first casing section at a second end thereof.

5. The compact seismic source of claim 4, further comprising:
    at least one bearing for the push-pull rod disposed in the first casing section; and
    a guide for the push-pull rod disposed in the second casing section.

6. The compact seismic source of claim 1, further comprising:
    a gas reservoir operationally coupled to the chamber; and
    an excitation actuator;
    wherein the controller is electrically connected to the gas reservoir and the excitation actuator to control their operation including controlling a resonating frequency for the compact seismic source.

7. The compact seismic source of claim 1, wherein the bulkhead defines a plurality of the fluid-tight chambers within the casing that are arranged in a powers-of-two distribution.

8. The compact seismic source of claim 1, further comprising masses free to vibrate longitudinally on springs.

9. The compact seismic source of claim 1, wherein the controller is electrically connected to the compact seismic source via an umbilical.

10. The compact seismic source of claim 1, wherein the controller is housed within the casing.

11. The compact seismic source of claim 1, wherein the low-frequency, humming seismic signal that is radiated is in the range of 0.5-2 Hz.

12. The compact seismic source of claim 1, wherein the low-frequency reciprocating drive disposed within the fluid tight chamber that, in operation, reinforces the natural reciprocating oscillation of the first and second casing sections relative to one another at a frequency of less than about 4 Hz as the low frequency.

13. The compact seismic source of claim 1, wherein the first mass and the second mass are each selected to be about equal to one another when a first resonant frequency is generated as the predetermined resonant frequency for the source.

14. The compact seismic source of claim 13, wherein the first mass and the second mass are each selected to be unequal to one another when a second resonant frequency lower in frequency than the first resonant frequency is generated as the predetermined resonant frequency for the source.

15. The compact seismic source of claim 1, wherein the first mass is within approximately +/−10% of the second mass.

16. The compact seismic source of claim 4, further comprising:
    a sliding seal engaged between an outer surface of the first casing section and an inner surface of the second casing section;
    wherein the outer surface of the first casing section, the inner surface of the second casing section, and the sliding seal are disposed about the push-pull rod; and
    wherein the sliding seal is configured to slide along the outer surface of the first casing section or the inner surface of the second casing section as the first casing section and the push-pull rod actuate relative to the second casing section.

17. A compact marine seismic source for seismic acquisition generating a humming signal, the source comprising:

a casing defining a gas filled fluid tight chamber, wherein the casing comprises a first casing section and a second casing section;

a sliding seal engaged between an outer surface of the first casing section and an inner surface of the second casing section;

an excitation actuator positioned within the second casing section; and a push-pull rod positioned within the first casing section and the second casing section, wherein the push-pull rod comprises a first end coupled to the excitation actuator and a second end affixed to the first casing section, wherein the excitation actuator is configured to oscillate the push-pull rod and the first casing section relative to the second casing section at a low frequency to slide the sliding seal along the outer surface of the first casing section or the inner surface of the casing section and to omni-directionally radiate a humming seismic signal.

18. The compact seismic source of claim 17, further comprising a bulkhead positioned within the fluid tight chamber, wherein the bulkhead includes a port that is configured to be selectively opened to allow fluid communication through the bulkhead.

19. The compact seismic source of claim 17, wherein the humming seismic signal has a frequency of less than about 8 Hz.

20. The compact seismic source of claim 17, wherein the first casing section has a first mass and the second casing section has a second mass, and wherein the first mass is within approximately +/−10% of the second mass.

* * * * *